Sept. 14, 1926.
C. M. JAYNES
1,599,769
EYEGLASS WIPER
Filed Oct. 9, 1925
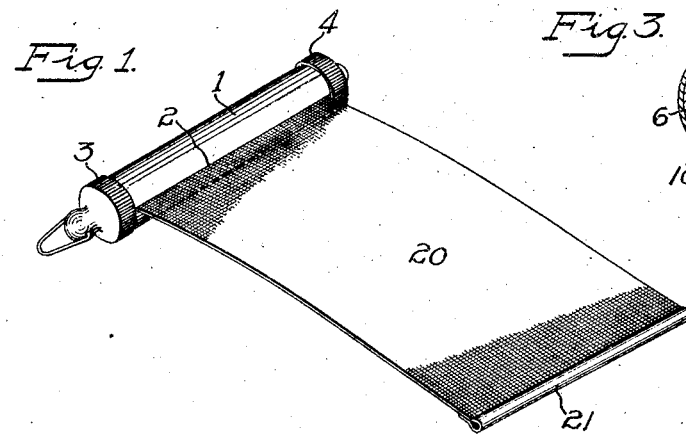
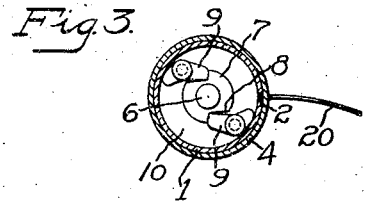
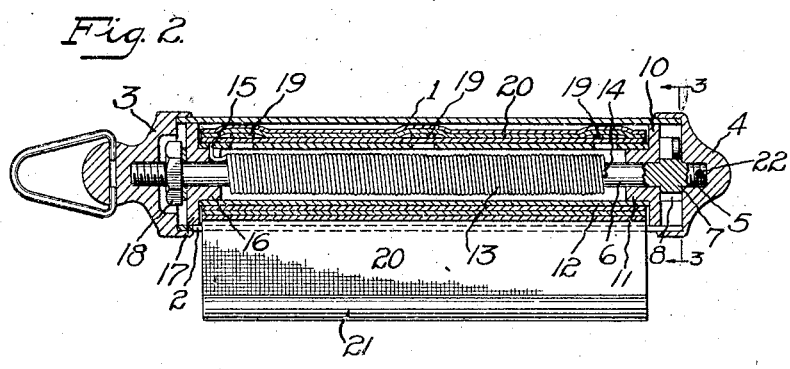
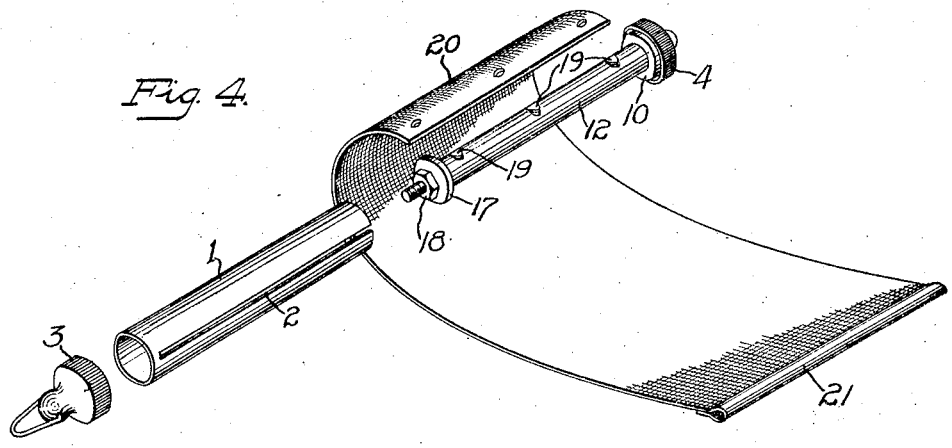
INVENTOR
Clara M. Jaynes.
BY
ATTORNEY Patented Sept. 14, 1926.

1,599,769

UNITED STATES PATENT OFFICE.

CLARA M. JAYNES, OF DETROIT, MICHIGAN.

EYEGLASS WIPER.

Application filed October 9, 1925. Serial No. 61,413.

At the present time there is no device in general use in which an eye glass wiping element may be carried, which is handy, easy to carry, and in which the wiping element is kept clean when not actually in use. It is an object of this invention to provide an eye glass wiper consisting of a small casing within which a wiping element is normally wound around a roller, and out of which the wiping element may be partly pulled when needed.

Another object of the invention is to provide an eye glass wiper having a spring actuated roller to insure the wiping element remaining normally in rolled position within the casing, and also having engaging means for holding the wiping element in unrolled position.

A further object of the invention is to provide an eye glass wiper so designed that the wiping element may be easily removed from or replaced on the roller.

With these and other objects in view, the invention is hereinafter more particularly described with the aid of the accompanying drawings and claim.

Figure 1 illustrates the invention with the wiping element extending out of the casing.

Figure 2 is a longitudinal section through the device.

Figure 3 is a detail showing the holding mechanism for the roller when the wiping element is pulled outwards.

Figure 4 shows the various parts ready for assembly when inserting a new wiping element.

Referring to the drawings, 1 designates a tubular casing slotted longitudinally throughout the greater part of its length at 2. The casing terminates at one end in a top cap 3, and at the other end in a bottom cap 4. The latter is threaded internally at 5 to receive one end of the spindle 6, an enlarged portion 7 of which rests against the surface of the cap 4. On the periphery of the enlarged portion 7 notches 8 are provided with which the dogs 9 pivotally mounted on the spacer 10 cooperate. The spacer 10 bears against one side of the enlarged portion 7 and has an annular inward projection 11 over which one end of the roller 12 rests. A helical spring 13 is arranged around the spindle 6 and has one end 14 attached to the said spindle and the other end 15 is secured to the roller 12, which latter terminates at the top on the annular projection 16 of the member 17. The member 17 is held in position on the spindle 6 as by a nut 18, and the upper end of the spindle is in threaded engagement with the top cap 3.

The outer surface of the roller 12 has projections 19 to engage one end of the wiping element 20, which is usually made of fabric, and a thickened strip 21 is provided at the outer end of the wiping element the thickness of which is greater than the width of the longitudinal slot 2.

When the thickened strip 21 of the wiping element is pulled outwards the roller 12 revolves as also does the spacer 10 which is sweated or otherwise secured to the end of the roller. The rotation of the roller causes the spring 13 to be compressed as the spindle 6 is held stationary in the top and bottom caps 3 and 4. The casing 1 also remains stationary as its ends are a tight fit into the caps. The rotation of the spacer moves the dogs 9 around the enlarged portion 7 of the spindle 6 in which the notches 8 are provided, for it will be remembered that the spindle 6 remains stationary.

When it is desired to renew the wiping element 20, the top cap 3 is screwed off the spindle 6 and the casing 1 removed; in this connection it will be observed that the slot 2 extends to one end of the casing. The roller 12 with its element 20 are then exposed, so that the latter may be taken off the projections 19 and another placed thereon. If desired a pin 22 may be driven through the bottom cap 4 and the spindle 6 to eliminate any possibility of the spindle becoming loosened from the bottom cap when the top cap is turned.

In practice it will be found that the dogs 9 will engage the slots 8 so long as the casing is not held in an absolutely vertical position, and in this connection it may be added that the most convenient angle for holding the device when in use is with the casing in a more or less horizontal position.

While in the foregoing the preferred embodiment of the invention has been described and shown, it is understood that the construction is susceptible to such modifications as fall within the scope of the appended claim.

What I claim as my invention and desire to secure by Letters Patent is:

In an article of the character described, the combination of a casing slotted longitudinally, a cap secured to one end of said casing, a spindle having one end secured to said cap, a spacer member around said spindle and bearing against a portion of the latter of enlarged diameter, an annular roller having one end secured to said spacer member, a second spacer member to receive the other end of said annular roller, both of said spacer members being adapted to rotate around said spindle with said roller, dogs pivotally mounted on said first named spacer member adapted to engage slots in the enlarged portion of said spindle, said first named spacer the end of the cap and a portion of the casing forming an enclosed space around the enlarged portion of the spindle for the dogs, a removable cap in threaded engagement with the other end of the spindle, a wiping element attached to said roller and adapted to be wound around it, a spring around said spindle adapted to maintain said element in wound position, and a nut on the threaded end of the spindle to hold said roller and spacer members in position.

CLARA M. JAYNES.